United States Patent
Banatwala et al.

(10) Patent No.: US 9,917,808 B2
(45) Date of Patent: Mar. 13, 2018

(54) GROUPING ELECTRONIC MESSAGES

(71) Applicant: International Business Machines Corporation, Armonk, NY (US)

(72) Inventors: Mustansir Banatwala, Hudson, NH (US); David A. Brooks, Providence, RI (US); Joseph A. Russo, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1063 days.

(21) Appl. No.: 13/831,156

(22) Filed: Mar. 14, 2013

(65) Prior Publication Data

US 2014/0280619 A1    Sep. 18, 2014

(51) Int. Cl.
*H04L 12/58* (2006.01)

(52) U.S. Cl.
CPC .............. *H04L 51/36* (2013.01); *H04L 51/32* (2013.01)

(58) Field of Classification Search
CPC ......... H04L 51/12; H04L 51/16; H04L 51/33; H04L 67/306; H04L 51/32; H04L 51/36; H04L 12/58; H04L 12/585; H04L 51/00; H04L 63/0227; H04L 51/22; G06Q 10/10; G06Q 10/107; G06Q 50/01; G06Q 10/00; G06Q 30/00; G06C 50/01; G06C 30/00; G06F 17/30598; G06F 17/30702; G06F 17/30867; G06F 17/30876; Y10S 707/99943

See application file for complete search history.

(56) References Cited

U.S. PATENT DOCUMENTS

| | | | |
|---|---|---|---|
| 7,693,940 B2 | 4/2010 | Carmel et al. | |
| 7,818,378 B2 | 10/2010 | Buchheit et al. | |
| RE41,940 E * | 11/2010 | Aronson et al. | 709/206 |
| 2007/0043817 A1* | 2/2007 | Oliver et al. | 709/206 |
| 2009/0287780 A1* | 11/2009 | Gawor et al. | 709/206 |
| 2012/0110085 A1* | 5/2012 | Malik et al. | 709/205 |

(Continued)

OTHER PUBLICATIONS

"IBM Issues with the new Conversation Threads feature in Notes/Domino 8.0," [online] IBM Support Portal, Oct. 25, 2007, Copyright IBM Corporation [retrieved Mar. 14, 2013] retrieved from the Internet: <http://www-01.ibm.com/support/docview.wss?uid=swg21284223>, 3 pg.

(Continued)

*Primary Examiner* — Nicholas Taylor
*Assistant Examiner* — Michael Li
(74) *Attorney, Agent, or Firm* — Cuenot, Forsythe & Kim, LLC

(57) ABSTRACT

Arrangements relate to the grouping electronic messages by a messaging client. A plurality of electronic messages to a message recipient from a sender electronic messaging system can be received. Each of the electronic messages can include a container specification, which can include an identifier assigned by the sender electronic messaging system. The identifiers of the received electronic messages can be compared. A plurality of the received electronic messages having the same identifier can be grouped. The grouped electronic messages can be presented as a single electronic message to the message recipient.

13 Claims, 4 Drawing Sheets

(56) References Cited

U.S. PATENT DOCUMENTS

2012/0149405 A1    6/2012   Bhat

OTHER PUBLICATIONS

Klyne, G. et al., "Standards Track, Mail and MIME Header Fields," [online] IETF.org, RFC 4021, The Internet Society © Mar. 2005 [retrieved Mar. 14, 2013] retrieved from the Internet: <http://tools.ietf.org/html/rfc4021#section-2.1.10>, 54 pg.

Crocker, D.H., "Standard for the Format of ARPA Internet Text Messages," [online] IETF.org, RFC 822, Aug. 13, 1982 [retrieved Mar. 14, 2013] retrieved from the Internet: <http://tools.ietf.org/html/rfc822#section-4.6.3>, 50 pgs.

* cited by examiner

200

```
┌─────────────────────────────────────┐
│ Receiving a plurality of electronic │
│ messages to a message recipient     │
│ from a sender electronic messaging  │
│ system, each of the electronic      │
│ messages including a container      │
│ specification including an          │
│ identifier assigned by the sender   │
│ electronic messaging system         │
│                 205                 │
└─────────────────────────────────────┘
                  │
┌─────────────────────────────────────┐
│ Comparing the identifiers of the    │
│ received electronic messages        │
│                 210                 │
└─────────────────────────────────────┘
                  │
┌─────────────────────────────────────┐
│ Grouping a plurality of the         │
│ received electronic messages        │
│ having the same identifier          │
│                 215                 │
└─────────────────────────────────────┘
                  │
┌─────────────────────────────────────┐
│ Presenting the grouped electronic   │
│ message as a single electronic      │
│ message to the message recipient    │
│                 220                 │
└─────────────────────────────────────┘
```

FIG. 2

GROUPING ELECTRONIC MESSAGES

BACKGROUND

There are various systems (e.g., programs, websites, social media websites, etc.) that notify users based on content or activity that is relevant to the user. Such notifications can be viewed by the user directly in the particular system. However, an alternative means used by such systems to notify the user is electronic mail. In such case, the systems automatically send an electronic mail message notifying the user of content or activity that is relevant to the user.

For instance, a user may post an item (e.g., status, text, photo, etc.) on the user's page of a social media website. The social media website can be configured to notify the user by sending an electronic mail message to the user each time that another user comments on the user's post. As another example, a user may belong to an online community. The community messaging system can send electronic mail notifications to community members for each change or update that occurs in the online community.

However, if there is a large amount of activity, the user's email inbox will receive a large quantity of individual electronic mail message from the system. In such case, the user's inbox can become bloated with electronic mail notifications, burdening the user with having to individually review each of these electronic mail messages. Consequently, the user may even ignore or delete the messages without having read them.

Some systems allow a user to disable such electronic mail notifications. In such case, this alternative manner of keeping updated on the latest developments within the system will no longer be available to the user. As a result, the only way the user can keep apprised of activity within the system is by directly accessing the system, which may not practical or convenient for the user in some instances.

BRIEF SUMMARY

One or more embodiments disclosed within this specification relate to electronic messages and, more particularly, to systems and methods for grouping electronic messages.

An embodiment can include a method of grouping electronic messages by a messaging client. The method can include receiving a plurality of electronic messages to a message recipient from a sender electronic messaging system. Each of the electronic messages can include a container specification. The container specification can include an identifier assigned by the sender electronic messaging system. The method can further include comparing the identifiers of the received electronic messages. The method can further include grouping a plurality of the received electronic messages having the same identifier. The method can further include presenting the grouped electronic messages as a single electronic message to the message recipient.

Another embodiment can include a system for grouping electronic messages by a messaging client. The system can have a processor programmed to initiate executable operations. The executable operations receiving a plurality of electronic messages to a message recipient from a sender electronic messaging system. Each of the electronic messages can include a container specification. The container specification can include an identifier assigned by the sender electronic messaging system. Further, the executable operations can include comparing the identifiers of the received electronic messages. The executable operations can also include grouping a plurality of the received electronic messages having the same identifier. The executable operations can further include presenting the grouped electronic messages as a single electronic message to the message recipient.

Another embodiment can include a computer program product for grouping electronic messages. The computer program product can include a computer-readable storage medium having stored thereon program code that, when executed, configures a processor to perform a method. The method can include receiving, by the processor, a plurality of electronic messages to a message recipient from a sender electronic messaging system. Each of the electronic messages can include a container specification. The container specification can include an identifier assigned by the sender electronic messaging system. The method can also include comparing, by the processor, the identifiers of the received electronic messages. The method also can include grouping, by the processor, a plurality of the received electronic messages having the same identifier. The method also can include presenting the grouped electronic messages as a single electronic message to the message recipient.

BRIEF DESCRIPTION OF THE SEVERAL VIEWS OF THE DRAWINGS

FIG. 2 is a flow chart illustrating a method of grouping electronic messages in accordance with another embodiment disclosed within this specification.

DETAILED DESCRIPTION

Figure 1:
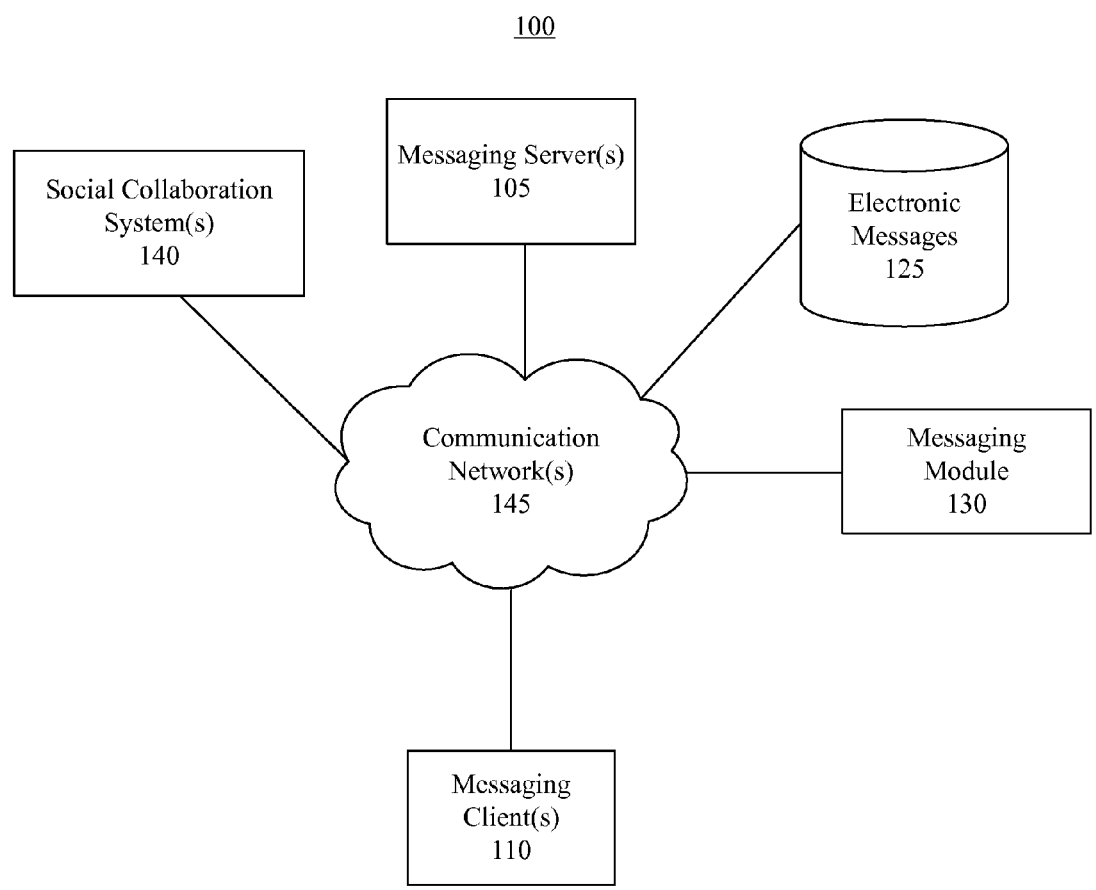
FIG. 1 is a block diagram illustrating a system for grouping electronic messages in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating a messaging system 100 for grouping electronic messages in accordance with one embodiment of the present invention. The messaging system 100 can include one or more messaging servers 105, one or more messaging clients 110, and a data store of electronic messages 125. The messaging system 100 further can include a messaging module 130. The messaging system 100 can further include one or more social collaboration systems 140. The various components of system 100 can be communicatively linked through one or more communication networks 145. As used herein, the term "communicatively linked" can include direct or indirect connections through a communication channel or pathway or another component or system. A "communication network" means one or more components designed to facilitate the delivery of information from one source to another.

The one or more communication networks 145 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 145 further can be implemented as or include one or more wireless networks, whether short or long range. For example, in terms of short range wireless networks, the communication network 145 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 145 can include a mobile, cellular, and or satellite-based wireless network and support voice, video, text, and/or any combination thereof. Examples of long range wireless networks can include GSM, TDMA, CDMA, WCDMA networks or the like. The communication network 145 can include wired communication links and/or wireless communication links. The communication network 145 can include any combination of the above networks and/or other types of networks. The network can include one or more routers, switches, access points, wireless access points, and/or the like.

The messaging system 100 can be implemented as, for example, an electronic mail system, an instant messaging (IM) system, a Short Messaging System (SMS), or the like. In this regard, the one or more messaging servers 105 can be implemented as an electronic mail server, an instant messaging server, an SMS server, or other communication hub or server capable of routing and storing electronic messages within or as part of the communication network 145. In any case, the messaging server 105 can include suitable operational software for performing the various functions described herein.

The messaging client(s) 110 can be implemented as any of a variety of communication devices executing suitable communication software. For example, each messaging client can be implemented as a computer system or other information processing system. One or more of the messaging clients 110 may also be implemented as a portable or mobile computing device, e.g., a mobile telephone, a smart phone, a wireless-enabled personal digital assistant, a portable computer, e.g., laptop, tablet or the like. Each of the messaging clients 110 can include and/or execute suitable communication software, e.g., an IM client, an electronic mail client, or an SMS client, which enables the messaging client to communicate with the messaging server 105 and/or other messaging clients through the communication network 145 and perform the functions disclosed herein. In one embodiment, the electronic messages 125 can include more than one type of electronic message. For example, the electronic messages 125 can store any combination of electronic mails, IMs, text messages, or the like.

The data store of electronic messages (electronic messages) 125 can include a plurality of electronic messages sent among the various users of the messaging system 100. The electronic messages 125 can represent a collection of messages, or all messages, sent among one or more or all users of the messaging system 100. Whether SMS, electronic mail, IM type messages, or other sorts of electronic messages, each electronic message within the electronic messages 125 can specify one or more recipients, a sender, as well as timestamp information specifying a date and/or time the electronic message originated and/or was delivered to the recipient(s).

It should be appreciated that while a single data store is illustrated in FIG. 1, a plurality of data stores, each storing electronic messages can be included. For example, one data store can include IM type electronic messages while another includes electronic mail messages. In another example, each data store need not store electronic messages of differing types. Multiple data stores may be applicable in cases where one messaging client downloads electronic messages locally, e.g., a POP3 client, while other messaging clients interact with one or more centralized servers upon which electronic messages are stored, while allowing local replication of electronic messages to the client machine.

As used herein, a "recipient" of an electronic message can be a user or communication address of a user specified in a "to" field of the electronic message. A recipient further can be a user or communication address specified in another field such as a "carbon copy" or "cc" field, a "blind copy" or "bc" field, or the like. Any user or communication address of a user that receives an electronic message can be considered a recipient of that electronic message. The "sender" may be considered the user, entity, system or communication address from which the electronic message was sent or originated. Within this specification, the term "user" and "communication address" may be used interchangeably as each refers to a particular online entity, user identity, or profile. Likewise, the terms "sender" or "recipient" also may be used to refer to a "user", "system", "entity" or a "communication address" of a user, system or entity as the case may be.

The system 100 can include one or more social collaboration system 140. "Social collaboration system" as used herein refers to applications, programs and/or web-based technologies used to turn communication into interactive dialogue between organizations, communities, and individuals. Examples of social collaboration systems include, for example, collaborative projects, blogs, micro blogs, wikis, content communities, websites and social networking sites. The social collaboration system 140 can support messaging (e.g., an electronic mail system, an instant messaging (IM) system, a Short Messaging System (SMS), or the like). The one or more collaboration system 140 can be communicatively linked to the one or more messaging clients 110 and/or the messaging server 105.

In operation, an electronic message can be created within one of the messaging clients, e.g., messaging client 110, the social collaboration system 140 or other systems. At any point between creation of the electronic message and delivery of the message to one or more of the recipients, the electronic message can be assigned a container specification assigned by the sender electronic messaging system. "Container specification" is defined as any data, information, file, command, instruction or other item associated with an electronic message that can be processed by a messaging client, server or module that can affect how an electronic message is presented by a messaging client.

Each electronic message sent by the electronic messaging system can be assigned a container specification. A container specification can include an identifier assigned by the sender electronic messaging system. The identifier is non-hierarchical in that it is assigned by the sender electronic messaging system based on a predetermined topical grouping. Thus, the identifier does not point to other messages in a hierarchy (i.e., a message in a reply chain). The identifier can be provided in any suitable form. For instance, the identifier can include a plurality of characters, which can be, for example, numbers, letters, symbols or combinations thereof.

The identifier can be assigned to each electronic message in any suitable manner defined by the sender electronic messaging system. For instance, a unique identifier can be assigned to a container defined by the sender electronic messaging system. For instance, the container can be a message recipient of the electronic messaging system. Alternatively, the container can be any electronic messages sent from a group or a particular website, program, or social collaboration system. The container can be based on a particular item (file, text, photo, video, audio, topic, etc.) sent from a particular sender messaging system.

The messaging system 100 can include a messaging module 130. In one embodiment, the messaging module 130 can be stored on, accessed by and/or executed on the one or more messaging clients 110 of an electronic message recipient. Alternatively or in addition, the messaging module 130 can be stored on, accessed by and/or executed on the messaging server 105 of an electronic message recipient.

The messaging module 130 can be implemented as computer readable program code that, when executed by a processor, implement the various processes described herein including implementing container specifications received with electronic messages. The messaging module 130 can process messages within the messaging system 100, e.g., electronic messages 125, whether within a single data store or located across a plurality of different data stores. The messaging module 130 and/or the meeting database can be components of the messaging server 105, or the messaging module 130 and/or the meeting database can be executed on and/or distributed among other processing systems to which the messaging server 105 is communicatively linked.

When a plurality of electronic messages is received by the messaging client 110 and/or the messaging server 105 of an electronic mail recipient, the identifiers of the received electronic messages can be compared. If a plurality of the received electronic messages has the same identifier, the plurality of received electronic messages can be grouped. The grouped electronic messages can be presented as a single electronic message to the message recipient.

In some implementations, the specification container can include an instruction. An "instruction" is any data or information that specifies to a messaging client or messaging server of the recipient how messages are to be grouped and/or presented. The instruction can be defined in any suitable manner by the sender electronic messaging system. In one embodiment, the instruction can be a group label, which can be a label that can be presented when a plurality of electronic messages is grouped and presented as a single electronic message to the message recipient. For instance, the group label can be presented in the subject field of the single electronic message in an electronic message inbox. As an example, the group label could be "Social Networking Website QRS Activity."

In some implementations, the specification container can include a temporal instruction. The temporal instruction can define a time period in which electronic messages from the system are considered for grouping. The temporal instruction can specify any suitable time period. For example, the temporal instruction can be defined as one or more months, one or more weeks, one or more days, one or more hours, one or more minutes, etc. The instruction defining the group label can include at least in part an indication of the temporal instruction. For instance, if the temporal instruction is one day, the group label could be "Social Networking Website QRS Activity for Jan. 1, 2013."

In some instances, the specification container can be dynamic. That is, the specification container can change over time. For instance, the specification container can include an instruction specifying a first group label to present in any grouped messages. However, at a later time or after the occurrence of a condition or event, the specification container can be modified to include an instruction specifying a second group label to present in any grouped messages. The instruction specifying the second group label can override the instruction specifying the first group label.

It should be appreciated that the comparing, grouping and/or presenting of electronic messages as described herein can be performed by the messaging server 105 of the message recipient and/or the messaging client 110 of the recipient, or any combination thereof depending upon the particular implementation. In another embodiment, the messaging module 130 can perform such the comparing and grouping and may be invoked by either the messaging clients 110 and/or the messaging server 105.

FIG. 2 is a flow chart illustrating a method 200 of grouping electronic messages in accordance with one embodiment disclosed within this specification. At step 205, a plurality of electronic messages to a message recipient from a sender electronic messaging system can be received. Each of the electronic messages can include a container specification. The container specification can include an identifier assigned by the sender electronic messaging system.

At step 210, the identifiers of the received electronic messages can be compared. At step 215, a plurality of the received electronic messages having the same identifier can be grouped. At step 220, the grouped electronic messages can be presented as a single electronic message to the message recipient. Steps 210, 215, 220 can be performed on any suitable basis. For instance, one or more of the steps 210, 215, 220 can be performed on a continuous basis, a periodic basis, an irregular basis or a random basis.

Examples of various implementations of the arrangements herein will now be presented. Arrangements can be implemented with any messaging system as part of a social collaboration system, social media website, other website, program, etc.

In one example, a user can have his or her own page on a social networking website. On a social networking website, there are many types of there are many types of events that can occur with respect to an individual user. For instance, a user may receive friendship requests, receive posts on the user's page, receive notifications regarding the administration of the user's social network account (e.g. password change, account information change, setting change, system availability, etc.), or the user may be tagged in a photo, video or other content. Such events can result in automatic electronic mail notification being generated and sent to a message recipient (i.e., the user).

As noted above, the identifier can be defined in any suitable manner. For instance, a unique identifier can be associated with each user of the social networking website. Thus, any electronic message notifications that are sent to the user from the sender electronic messaging system (i.e., the messaging system of the social media website) can be assigned that identifier. Thus, when a plurality of electronic messages is received by the message recipient's messaging client, the identifiers of received electronic messages can be compared. A plurality of received electronic messages that have the same identifier can be group, and the grouped electronic messages can be presented as a single electronic message to the user.

The container specification can include instructions defining a group label, such as "Messages from Social Networking Website A." Again, the specification container can include a temporal period. Thus, a plurality of the electronic messages having the same identifier from the messaging system of the social media website that are received within the temporal period can be presented to the user. The group label can include an indication of the temporal period. For instance, the group label can be "Messages from Social Networking Website A for the date of Jan. 1, 2013."

The identifier can be assigned based on a particular event that occurs with respect each user on the social networking website. Each type of event can be assigned a particular identifier for each particular user. As an example, for each user, a first identifier can be assigned to electronic messages relating to friendship requests received, a second identifier can be assigned to electronic messages relating to posts on the user's page made by other users of the social networking website, and/or a third identifier can be assigned to electronic messages relating to network the administration of the user's social network account. Thus, a user may receive ten friendship requests from other users of the social networking website. The messaging system of the social media website can automatically send electronic messages regarding the friendship request to the user. The messaging system of the social media website can assign an identifier for all friendship requests for the user. The user's messaging client can receive, compare, group and present the electronic messages as described herein.

Yet another example can be an online community to which a plurality of users belongs. A user can post a comment, a file or begin a discussion topic in the online community. When such actions occur, the messaging system of the online community can automatically send electronic mail notifications to all users of the community. The messaging system of the online community can assign a container specification to each electronic message sent therefrom. The container specification can include an identifier.

As an example, the same identifier can be assigned for all electronic messages sent from the messaging system of the online community. Thus, all electronic messages generated from content, events or activities within the community would be assigned the same identifier. Alternatively, an identifier can be assigned based on the type of activity that has occurred in the community. For instance, electronic messages pertaining to a first discussion topic within the online community can be assigned a first identifier, and electronic messages pertaining to a second different discussion topic within the online community can be assigned a second identifier that is different than the first identifier.

When the messaging client of a user receives a plurality of electronic messages from the messaging system of the online community, the messaging client can compare the identifiers of the received electronic messages and group a plurality of the received electronic messages having the same identifier. The grouped electronic messages can be presented as a single electronic message to the message recipient. Thus, instead of seeing multiple electronic messages relating to occurrences within the community, the user can see a single grouped message.

In at least some instances, the container specification can include an instruction specified by the sender electronic messaging system (e.g., the messaging system of the online community). The instruction can define a group label to present for the single electronic message. For instance, the group label can be "Happenings in Your Community." The group label may also include an indication of the type of event. For instance, the group label can be "Happening in Your Community re Sales." Alternatively or in addition, the group label can include an indication of the temporal period specified by the instruction. For instance, if the instruction specifies a temporal period of one day, the group label can be applied to emails received from the online community electronic messaging system. For example, the group label for messages received on Jan. 1, 2013 would be "Happenings in Your Community on Jan. 1, 2013" and the group label for messages received on Jan. 2, 2013 can be "Happenings in Your Community on Jan. 2, 2013" and so on.

In a further example, a shipping company can have a system to send notifications by electronic messages to a message recipient (e.g. the sender and/or the recipient of a letter, parcel or package). For instance, an electronic message can be sent when the package is received by the shipping company. Another electronic message can be sent when the package has been delivered to the recipient. Additional electronic messages can be sent in between these events to provide updates on the status of the package (e.g., current location, out for delivery, revisions to estimated delivery date, etc.).

The electronic messages can be assigned a container specification by the sender (e.g., the shipping company) electronic messaging system. The container specification can include an identifier assigned by the sender electronic messaging system. The messaging client can receive a plurality of electronic messages to a message recipient (e.g., the sender and/or the recipient of the package). The messaging client can compare the identifiers of the received electronic messages and can group a plurality of the received electronic messages having the same identifier. The grouped electronic messages can be presented as a single electronic message to the message recipient.

In one implementation, the container specification can include an instruction defining a group label to present for the single electronic message. As an example, the group label can be the current status of the package. However, the status of the package can change so the group label presented to can be adaptive to reflect the most recent status of the package. Thus, the instruction can indicate that group label specified in most recent of the grouped electronic messages is the group label that is presented to the message recipient in the single electronic message. In this way, the message recipient can be apprised of the most current information regarding the shipment.

Figure 3:
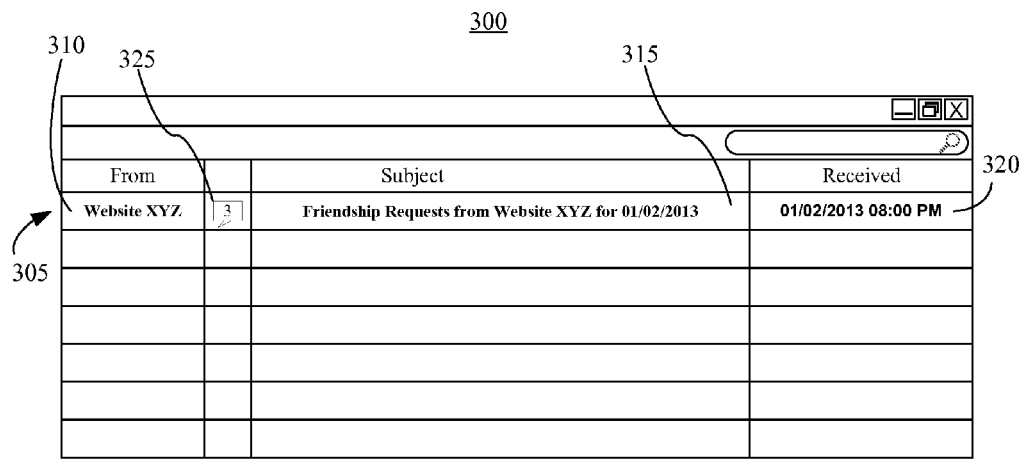
FIG. 3 is a graphical user interface for grouping electronic messages in accordance with one embodiment disclosed within this specification, showing a plurality of electronic messages presented as a single electronic message to a message recipient.

FIG. 3 is a view of an example of a user interface (messaging inbox 300) that can be displayed by a messaging client 110. The messaging inbox 300 illustrates the manner in which the system described with reference to FIGS. 1 and 2 can present electronic messages grouped by the messaging module 130. The messaging module 130 can execute real-time communication client software that causes the messaging client 110 to present or display a user interface, such as messaging inbox 300, to the user.

The messaging inbox 300 can be organized and/or arranged in any suitable manner. It will be understood that the messaging inbox 300 presented in FIG. 3 is merely an example, and it can be arranged and/or organized differently and may include additional or fewer features. The individual electronic messages received by the messaging client can be presented as separate entries in rows and can be ordered in any suitable manner, such as by the date and time received. Information pertaining to each message can be presented in fields across each row.

With respect to a plurality of electronic messages groups according to arrangements described herein, the grouped electronic messages can be presented as a single electronic message 305 to the message recipient. An example of such a presentation is shown in FIG. 3. There can be a from field 310, a subject field 315 and a received field 320. The from field 310 can indicate the identity of the sender of the email. The subject field 315 can present the subject line included in the electronic message, if any. When a plurality of electronic messages are grouped according to arrangements herein, the subject field 315 can be populated at least in part with the group label defined by the instruction included with the container specification assigned by the sender electronic messaging system.

The received field 320 can present the date and time that the electronic message was received. In the case of a plurality of electronic messages grouped and presented according to arrangements herein, the date of the most recent message received can be presented. The messaging inbox can be updated accordingly as new electronic messages are added to the group.

A quantity indicator field 325 can be provided. In the quantity indicator field 325, the quantity of electronic messages grouped into the single electronic message can be presented. The quantity indicator can be updated accordingly as new electronic messages are added to the group.

Figure 4:
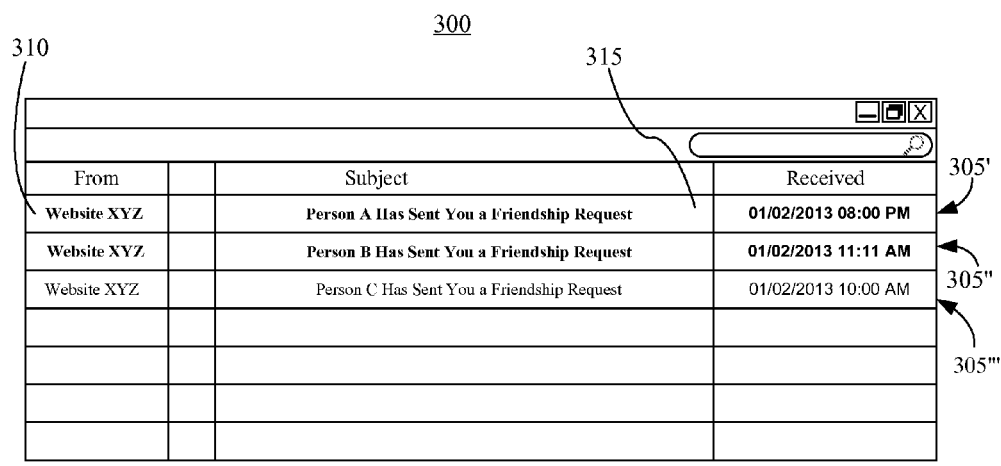
FIG. 4 is a graphical user interface for grouping electronic messages in accordance with one embodiment disclosed within this specification, showing a single electronic message expanded to separately present the individual electronic messages thereof to a message recipient.

The single electronic message 305 can be selectively expanded to separately present the individual electronic messages thereof. Likewise, when presented in an expanded form, the plurality of grouped electronic messages can be selectively contracted into a single electronic message. FIG. 4 is a view of an example of the messaging inbox 300 that can be displayed by the messaging client 110 when the single electronic message 305 is expanded to separately present the plurality of individual electronic messages 305', 305", 305''' thereof.

The selective expanding and contracting of the single electronic message 305 can be performed in any suitable manner. In one implementation, the user may be able to selectively expand the single electronic message 305 by user input. As an example, the user can select (e.g. by a mouse click, touching or otherwise engaging) at least a portion of the single electronic message. For instance, a user can select anywhere in the quantity indicator field 325.

As another example, one or more user interface elements, such as graphical user interface elements (e.g. buttons) can be presented to the user. In yet another example, when a user's pointer hovers over the single electronic message, a pop-up window can be presented which separately presents the individual electronic messages of the single electronic message.

Arrangements described herein can facilitate a user's interaction with a messaging client. By grouping a plurality of related electronic messages into a single electronic message, bloat of a messaging inbox can be avoided. As a result, a more streamlined interface is presented to the user. The user can review all pertinent electronic messages pertaining to a particular topic instead of having to navigate through a cluttered message inbox to find each pertinent message. Further, it can allow the sender electronic messaging system to at least partially define the manner in which the grouped electronic messages are presented to a message recipient on the messaging client.

Figure 5:
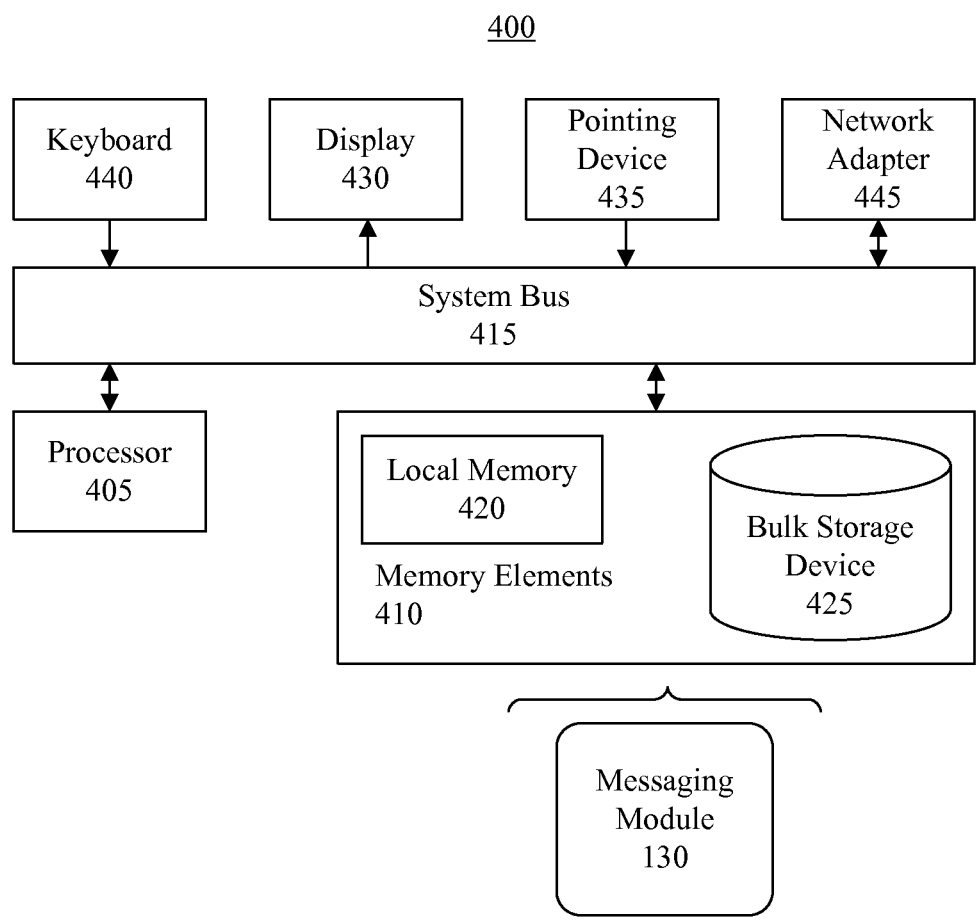
FIG. 5 is a block diagram illustrating a system for grouping electronic messages in accordance with one embodiment disclosed within this specification.

FIG. 5 is a block diagram illustrating an example of a data processing system 400. System 400 can include at least one processor (e.g., a central processing unit) 405 coupled to memory elements 410 through a system bus 415 or other suitable circuitry. As such, system 400 can store program code within memory elements 410. Processor 405 executes the program code accessed from memory elements 410 via system bus 415 or the other suitable circuitry.

In one aspect, system 400 is implemented as a computer or other programmable data processing apparatus that is suitable for storing and/or executing program code. It should be appreciated, however, that system 400 can be implemented in the form of any system including a processor and memory that is capable of performing and/or initiating the functions and/or operations described within this specification. Further, system 400 can be implemented in any of a variety of different form factors including, but not limited to, a portable device such as a mobile communication device, a tablet computing and/or communication device, a laptop computing device, a desktop computing device, a server, or the like.

Memory elements 410 include one or more physical memory devices such as, for example, local memory 420 and one or more bulk storage devices 425. Local memory 420 refers to RAM or other non-persistent memory device(s) generally used during actual execution of the program code. Bulk storage device(s) 425 can be implemented as a hard disk drive (HDD), solid state drive (SSD), or other persistent data storage device. System 400 also can include one or more cache memories (not shown) that provide temporary storage of at least some program code in order to reduce the number of times program code must be retrieved from bulk storage device 425 during execution.

Input/output (I/O) devices such as a keyboard 440, a display 430, and a pointing device 435 optionally can be coupled to system 400. The I/O devices can be coupled to system 400 either directly or through intervening I/O controllers. One or more network adapters 445 also can be coupled to system 400 to enable system 400 to become coupled to other systems, computer systems, remote printers, and/or remote storage devices through intervening private or public networks. Modems, cable modems, wireless transceivers, and Ethernet cards are examples of different types of network adapters 445 that can be used with system 400.

As pictured in FIG. 5, memory elements 410 can store the components of the system 100 of FIG. 1, namely, the messaging module 130. The messaging module 130, being implemented in the form of executable program code, is executed by system 400 and, as such, is considered an integrated part of system 400. The messaging module 130 can perform the comparing, grouping and/or presenting steps described herein. Moreover, the messaging module 130, including any parameters and/or attributes utilized by module 130, are functional data structures that impart functionality when employed as part of system 400.

As used herein, "outputting" and/or "output" can mean storing in memory elements 410, for example, writing to a file stored in memory elements 410, writing to display 430 or other peripheral output device, playing audible notifications, sending or transmitting to another system, exporting, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer hardware system configured to group electronic messages by a messaging client comprising:
   a hardware processor programmed to initiate executable operations comprising:
      receiving a plurality of electronic messages to a message recipient from a sender electronic messaging system, each of the electronic messages including a container specification including an identifier assigned by the sender electronic messaging system;
      comparing the identifiers of the received electronic messages;
      grouping a plurality of the received electronic messages having the same identifier; and
      presenting the grouped electronic messages as a single electronic message to the message recipient.

2. The system of claim 1, wherein
   the single electronic message is selectively expandable to separately present the individual electronic messages thereof.

3. The system of claim 1, wherein
   the container specification further includes an instruction specified by the sender electronic messaging system, the instruction defining a group label to present for the single electronic message, and wherein presenting the grouped electronic messages as a single electronic message to the message recipient includes presenting the single electronic message with the group label defined by the instruction.

4. The system of claim 3, wherein
   the group label presented is adjustable, and wherein the group label is defined by the instruction included in most recent electronic message having the same identifier received from the sender electronic messaging system.

5. The system of claim 1, wherein
   the container specification further includes a temporal period instruction specified by the sender electronic messaging system, wherein the comparing, grouping and presenting are performed for electronic messages received within the temporal period specified in the instruction.

6. The system of claim 5, wherein
   the container specification further includes an instruction specified by the sender electronic messaging system, the instruction defining a group label to present for the single electronic message, the group label including an indication of the temporal period specified by the instruction, and wherein presenting the grouped electronic messages as a single electronic message to the message recipient includes presenting the single electronic message with the group label defined by the instruction.

7. The system of claim 5, wherein
   the sender electronic messaging system is a social collaboration system.

8. A computer program product for grouping electronic messages, the computer program product comprising
   a computer readable storage medium having program code embodied therewith, the program code executable by a processor to perform a method comprising:
      receiving, by the processor, a plurality of electronic messages to a message recipient from a sender electronic messaging system, each of the electronic messages including a container specification including an identifier assigned by the sender electronic messaging system;
      comparing, by the processor, the identifiers of the received electronic messages;
      grouping, by the processor, a plurality of the received electronic messages having the same identifier; and
      presenting the grouped electronic messages as a single electronic message to the message recipient.

9. The computer program product of claim 8, wherein the single electronic message is selectively expandable to separately present the individual electronic messages thereof.

10. The computer program product of claim 8, wherein the container specification further includes an instruction specified by the sender electronic messaging system, the instruction defining a group label to present for the single electronic message, and wherein presenting the grouped electronic messages as a single electronic message to the message recipient includes presenting the single electronic message with the group label defined by the instruction.

11. The computer program product of claim 10, wherein the group label presented is adjustable, and wherein the group label is defined by the instruction included in most recent electronic message having the same identifier received from the sender electronic messaging system.

12. The computer program product of claim 8, wherein the container specification further includes a temporal period instruction specified by the sender electronic messaging system, wherein the comparing, grouping and presenting are performed for electronic messages received within the temporal period specified in the instruction.

13. The computer program product of claim 12, wherein the container specification further includes an instruction specified by the sender electronic messaging system, the instruction defining a group label to present for the single electronic message, the group label including an indication of the temporal period specified by the instruction, and wherein presenting the grouped electronic messages as a single electronic message to the message recipient includes presenting the single electronic message with the group label defined by the instruction.

\* \* \* \* \*